United States Patent
Olde Boerrigter et al.

(10) Patent No.: US 10,100,133 B2
(45) Date of Patent: Oct. 16, 2018

(54) PROCESS FOR FUNCTIONALISING POLYMERS

(71) Applicant: Akzo Nobel Chemicals International B.V., Arnhem (NL)

(72) Inventors: Joseph Christiaan Olde Boerrigter, Bathmen (NL); Auke Gerardus Talma, Bathmen (NL); Waldo Joseph Elisabeth Beek, Deventer (NL)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/568,545

(22) PCT Filed: Apr. 21, 2016

(86) PCT No.: PCT/EP2016/058823
§ 371 (c)(1),
(2) Date: Oct. 23, 2017

(87) PCT Pub. No.: WO2016/170019
PCT Pub. Date: Oct. 27, 2016

(65) Prior Publication Data
US 2018/0118857 A1 May 3, 2018

(30) Foreign Application Priority Data
Apr. 24, 2015 (EP) .................................. 15165046

(51) Int. Cl.
| | | |
|---|---|---|
| *C08J 3/24* | (2006.01) | |
| *C08K 5/28* | (2006.01) | |
| *C08K 5/3415* | (2006.01) | |
| *C08L 23/36* | (2006.01) | |
| *C08L 51/04* | (2006.01) | |
| *C08C 19/30* | (2006.01) | |
| *C08G 81/02* | (2006.01) | |

(Continued)

(52) U.S. Cl.
CPC .............. *C08C 19/30* (2013.01); *C08G 81/02* (2013.01); *C08J 3/247* (2013.01); *C08K 5/28* (2013.01); *C08L 9/06* (2013.01); *C08L 23/06* (2013.01); *C08L 23/12* (2013.01); *C08L 23/16* (2013.01); *C08L 23/26* (2013.01); *C08J 2325/10* (2013.01); *C08J 2331/04* (2013.01); *C08J 2351/04* (2013.01); *C08L 2205/08* (2013.01)

(58) Field of Classification Search
CPC ......... C08C 19/00; C08C 19/22; C08G 81/02; C08J 3/247; C08J 2325/10; C08J 2331/04; C08J 2351/04
See application file for complete search history.

(56) References Cited

U.S. PATENT DOCUMENTS

| | | |
|---|---|---|
| 3,205,206 A | 9/1965 | Marcantonio et al. |
| 3,250,731 A | 5/1966 | Buhl et al. |

(Continued)

FOREIGN PATENT DOCUMENTS

| | | |
|---|---|---|
| DE | 4328839 A1 * | 7/1995 |
| EP | 0 019 122 A2 | 11/1980 |

(Continued)

OTHER PUBLICATIONS

European Search Report issued in the counterpart European Application No. 15165046.2 dated Oct. 5, 2015.

(Continued)

*Primary Examiner* — Irina S Zemel
*Assistant Examiner* — Jeffrey S Lenihan
(74) *Attorney, Agent, or Firm* — Matthew D. Kellam

(57) ABSTRACT

Process for functionalizing a polymer by treating said polymer at a temperature in the range 80-250° C. with a mono-azide of the formula wherein m is 0 or 1, n is 0 or 1, n+m=1 or 2, X is a linear or branched, aliphatic or aromatic hydrocarbon moiety with 1-12 carbon atoms, optionally containing heteroatoms, $R_b$ is selected from the group consisting of hydrogen, linear and branched alkyl groups with 1-6 carbon atoms optionally substituted with O, S, P, Si, or N-containing functional groups, alkoxy groups with 1-6 carbon atoms, and halogens, and each $R_a$ is individually selected from hydrogen, linear or branched alkyl groups with 1-6 carbon atoms, or may form a saturated or unsaturated aliphatic or aromatic ring structure with at least one other $R_a$.

15 Claims, No Drawings

(51) Int. Cl.
*C08L 9/06* (2006.01)
*C08L 23/06* (2006.01)
*C08L 23/16* (2006.01)
*C08L 23/26* (2006.01)
*C08L 23/12* (2006.01)

(56) References Cited

U.S. PATENT DOCUMENTS

| | | |
|---|---|---|
| 3,631,182 A | 12/1971 | Breslow |
| 4,287,294 A | 9/1981 | Rubner et al. |
| 4,329,556 A | 5/1982 | Rubner et al. |
| 4,352,938 A | 10/1982 | Breslow |
| 5,844,049 A | 12/1998 | Datta et al. |
| 5,883,145 A | 3/1999 | Hurley et al. |
| 6,313,314 B1 | 11/2001 | Cheng et al. |
| 9,683,057 B2 | 6/2017 | Beek et al. |
| 9,688,783 B2 | 6/2017 | Beek et al. |
| 2003/0044468 A1 | 3/2003 | Cellesi et al. |
| 2006/0222765 A1 | 10/2006 | Stappers |
| 2009/0275703 A1 | 11/2009 | Alvarez Grima et al. |
| 2016/0280805 A1 | 9/2016 | Beek et al. |

FOREIGN PATENT DOCUMENTS

| | | |
|---|---|---|
| EP | 0 019 726 A1 | 12/1980 |
| EP | 0 143 380 A2 | 6/1985 |
| JP | 4372662 B2 | 11/2009 |
| WO | 2008/130894 A1 | 10/2008 |
| WO | 2012/116250 A1 | 8/2012 |
| WO | 2015/067531 A1 | 5/2015 |
| WO | 2015/067533 A1 | 5/2015 |
| WO | 2016/170018 A1 | 10/2016 |
| WO | 2016/170020 A1 | 10/2016 |

OTHER PUBLICATIONS

Notification of Transmittal of the International Search Report and the Written Opinion of the International Searching Authority, or the Declaration from the International Bureau of WIPO for International Application No. PCT/EP2016/058823 dated Jul. 11, 2016.
Bateman et al., "Sulfonyl Azides—An Alternative Route to Polyolefin Modification," Journal of Applied Polymer Science, vol. 84, (2002), pp. 1395-1402, XP-002719995.
Arslan et al., "Clickable Poly(ethylene glycol)-Based Copolymers Using Azide-Alkyne Click Cycloaddition-Mediated Step-Growth Polymerization," Macromolecular Chemistry and Physics, vol. 215, No. 22, Jun. 25, 2014, pp. 2237-2247, XP055215106.
Decker et al. "Photocrosslinking of a maleimide functionalized polymethacrylate," Polymer International, vol. 52, No. 5, Apr. 22, 2003 (Apr. 22, 2003), pp. 722-732, XP055215059.
Hall et al, "Synthesis and post-polymerization modification of maleimide-containing polymers by 'thiol-ene' click and Diels-Alder chemistries," Polymer International, vol. 60, No. 8, Jun. 28, 2011 (Jun. 28, 2011), pp. 1149-1157, XP055215363.
Anon, Research Disclosure (1999), 427 (Nov.), P-1472 (No. 427060).
"NHS/Nitrophenyl Azide Croslinkers" Dec. 24, 2005 (Dec. 24, 2005), pp. 1-3, Retrieved from: URL:https://www.funakoshi.co.jp/data/datasheet/PCC/22589.pdf [retrieved on Sep. 24, 2015], * p. 1 * XP055215882.
Mark et al., The Science and Technology of Rubber, 3rd edition, 2005, pp. 388-391.
Bouhelal et al, "Structure Modification of Isotactic Polypropylene through Chemical Crosslinking: Toughening Mechanism," Journal of Applied Polymer Science, vol. 103, No. 5, 1 (2006), pp. 2968-2976, * XP055216400.
A.J. Zielinska, Cross-Linking and Modification of Saturated Elastomers Using Functionalized Azides, Dissertation, University of Twente, Jul. 1, 2011 (1 of 2, cover page to p. 78).
A.J. Zielinska, Cross-Linking and Modification of Saturated Elastomers using Functionalized Azides, Dissertation, University of Twente, Jul. 1, 2011 (2 of 2, pp. 79-165).
Passaglia et al., "Effect of Structure of Functionalizing Molecules on the Inter-Macromolecular Reactions and Blending of Poly(ethylene-co-propylene) (EPM) With Poly (6-aminohexanoic Acid) (PA6)", Helvetica Chimica ACTA, vol. 89, No. 8, Aug. 30, 2006, pp. 1596-1609, XP-002720059.
J.K. Jorgensen et al., "Introduction of Long-Chain Branches in Linear Polyethylene by Light Crosslinking with 1,3-Benzenedisulfonyl Azide," Polymer, 46, (2005), pp. 12256-12266.

* cited by examiner

PROCESS FOR FUNCTIONALISING POLYMERS

This application is a national stage filing under 35 U.S.C. § 371 of PCT/EP2016/058823, filed Apr. 21, 2016, which claims priority to European Patent Application No. 15165046.2, filed Apr. 24, 2015, the contents of each of which are each incorporated herein by reference in their entirety.

The present invention relates to a process for functionalizing and for crosslinking polymers.

Polymers such as elastomers are known to be very apolar. This apolarity limits the uptake of polar compounds, such as fillers, and limits the resistance towards swell in apolar materials like oils and fuels.

The apolarity also limits the blending of these polymers with more polar polymers.

In so-called green tires (category A label tires), silica is used as a reinforcing filler to enhance properties like wet grip and rolling resistance to arrive at low fuel consumption, low noise generation, and durable safe tires. The interaction between the silica filler and the rubber is critical. Presently, the rubber-silica interaction is improved by additives such as bis(triethoxysilylpropyl)tetrasulfide (Si69); a bifunctional, sulfur-containing organosilane. These additives are added during the compounding of the silica into the rubber in an amount of 5-10 parts per 100 rubber (phr).

There are several recognized disadvantages of this approach. First of all, the organosilane reacts with the hydroxyl groups on the silica surface during the compounding step via a so-called silanization reaction. This leads to the release of volatiles like ethanol (in case of Si69), or even methanol (in case of other silanes). Secondly, the high reactivity between the organosilane and the silica surface leads to processing problems during and after mixing the silica into the rubber. This makes processing of the compounds tedious and only very skilled people can make these green tire compounds.

A preferred type of polymer to be used in green tires is SBR (styrene-butadinene rubber). There are two main types of SBR: solution-type SBR (s-SBR)—a polymer prepared by living anionic polymerization between styrene and butadiene, and emulsion-type SBR (e-SBR)—a polymer prepared by a radical polymerization between styrene and butadiene.

The interaction between s-SBR and silica can be improved by building-in functionalities during the polymerization, which is called reactor modification. Such modified sSBR grades are, however, not widely available and accessible. Further, reactor modification does not allow a compounder or tire manufacturer to design the compound recipe according their needs.

e-SBR is generally regarded as not modifiable in terms of structure and functionality.

It is therefore an object of the present invention to provide a polymer-filler composition with good polymer-filler and polymer-polymer interaction while allowing a compounder or tire manufacturer to design the compound recipe according its needs and without the requirement of modifying (e.g. silanizing) the filler surface.

It is a further object of the present invention to provide an increase the compatibility between polymers in a blend of polymers that would—without such modification—be incompatible, such as polypropylene and EVA.

Elastomers are conventionally crosslinked by using elemental sulfur combined with several sulfur vulcanization accelerators. Crosslinking with peroxides, however, gains more territory the last couple of years. Advantages of peroxide crosslinking are the better reversion resistance, better heat and chemical resistance and better compression set compared to sulfur-crosslinked systems.

Sulfur-based cure systems are generally not utilized for polyolefins because of the absence of unsaturations. In addition, discoloration by additives and the smell of sulfur components are highly undesirable in polyolefin applications.

Polyethylene is commonly cured with peroxides. Polypropylene, however, is known to degrade upon peroxide treatment. Peroxides are used to enhance the melt strength of polypropylene by creating long chain branches.

Both sulfur and peroxide based crosslinking lead to the evolution of organic volatiles, which are formed upon decomposition of either the peroxide or sulfur cure accelerators. In addition, the components of the cure systems, i.e. the sulfur, the accelerators, the peroxides, and/or decomposition products thereof, often tend to migrate to the surface of the treated polymer article (this is called blooming or staining), which can cause undesirable contact contamination to skin or other surfaces.

It would therefore be desirable to provide a process for polymer crosslinking which can be conducted without organic volatiles being formed.

It would be especially desirable if such crosslinking would be at least partly reversible, so that crosslinked material can be (partly) de-crosslinked and re-used again.

The above objects are achieved by the processes according to the present invention which improve the polymer-filler interaction without needing modification of the filler surface and which can be conducted such that nitrogen is the only volatile formed. In addition, this process allows the formation of thermally reversible crosslinks and can improve the compatibility between crosslinks.

The process involves the introduction of specific functional groups on the polymer backbone. During this functionalization, nitrogen is released. The optional second step of the process involves the reaction between said functional groups and a substance having one or more specific functionalities.

The process according to the present invention relates to a process for functionalizing a polymer by treating a mixture comprising said polymer at a temperature in the range 80-250° C. with a mono-azide of the formula

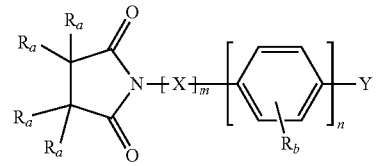

wherein Y is

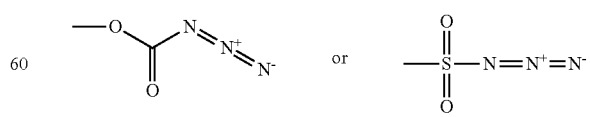

m is 0 or 1, n is 0 or 1, n+m=1 or 2, but preferably 1,

X is a linear or branched, aliphatic or aromatic hydrocarbon moiety with 1-12 carbon atoms, optionally containing heteroatoms, $R_b$ is selected from the group consisting of hydrogen, linear and branched alkyl groups with 1-6 carbon atoms optionally substituted with O, S, P, Si, or N-containing functional groups, alkoxy groups with 1-6 carbon atoms, and halogens, and each $R_a$ is individually selected from hydrogen, linear and branched alkyl groups with 1-6 carbon atoms or may form a saturated or unsaturated aliphatic or aromatic ring structure with at least one other $R_a$.

In one embodiment, the so-treated polymer is further reacted with a substance comprising one or more functionalities selected from amine, anhydride, alcohol, thiol, and aldehyde functionalities.

If the substance contains only one such functionality, this functionality will react with the succinimide- or succinimide-like function of the mono-azide, thereby allowing the introduction of further functionalities, for instance functionalities which improve the interaction with fillers or other polymers. For example, incompatible combinations of polypropylene and ethylene vinyl acetate copolymer (EVA) can be made compatible by functionalization of the polypropylene.

If the substance contains two or more of such functionalities, this might result in crosslinking.

Therefore, the present invention also relates to a process for crosslinking a polymer comprising the steps of:
a. functionalizing said polymer according the process described above to form a functionalized polymer and
b. reacting the functionalized polymer with a substance comprising two or more functionalities selected from amine, anhydride, alcohol, thiol, and aldehyde functionalities.

The term 'polymer' in the present application includes polymers and oligomers. That is, it includes materials made up from at least 2, preferably at least 5, and most preferably at least 10 monomeric units.

Polymers that can be suitably modified by this process include elastomers, chain saturated polymers, polyesters, and blends thereof. But also polycarbonates and polyimides can be modified with this process.

Examples of elastomers are natural rubber (NR), styrene butadiene rubber (SBR), butadiene rubber (BR), butyl rubber (IIR), ethylene propylene copolymer elastomer (EPM), ethylene propylene diene terpolymer elastomer (EPDM), and ethylene vinylacetate copolymer and copolymer elastomer (EVA and EVM).

Chain saturated polymers include polyolefins. Suitable polyolefins are polyethylene (LDPE, LLDPE, HDPE) and polypropylene (PP), both the homopolymers and co-polymers thereof. Examples of such co-polymers are polyolefin elastomers (POE), which are based on polyethylene-octene or -butane copolymers.

Examples of polyesters are polylactic acid (i.e. polylactide, PLA) and poly(hydroxyalkanoate)s like poly(hydroxybutyrate), poly(butylene succinate), polyglycolide, poly(ε-caprolactone), polyethylene terephthalate (PET), and polybutene terephthalate (PBT)

An example of a blend that can be functionalized is a blend of polyethylene and polypropylene.

In the above formula, $R_b$ is preferably hydrogen.

When X in the above formula contains heteroatoms, it preferably has one of the following structures:

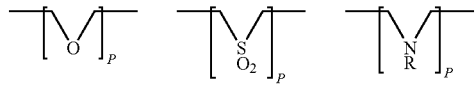

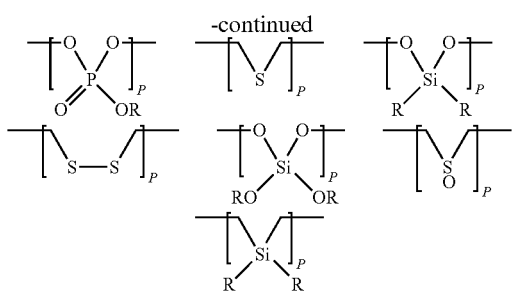

wherein P is an integer ranging from 1 to 6 and R is selected from the group consisting of H, alkyl, aryl, phenyl, and substituted phenyl groups.

More preferably, however, X is an aliphatic alkanediyl group with 1-12, more preferably 1-6, and most preferably 2-4 carbon atoms.

Particularly preferred mono-azides are succinimide-functionalized mono-azides; which means that all $R_a$-groups are hydrogen.

Particularly preferred succinimide-functionalized mono-azides are:

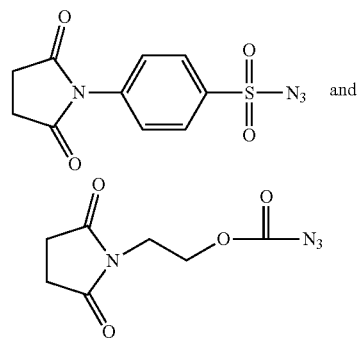

Further examples of mono-azides that can be used are exemplified below. Apart from the illustrated benzene sulfonyl azides, also the corresponding azidoformates (X=—CH$_2$CH$_2$—; m=1; n=0; Y=—O—C(=O)—N$_3$) can be used.

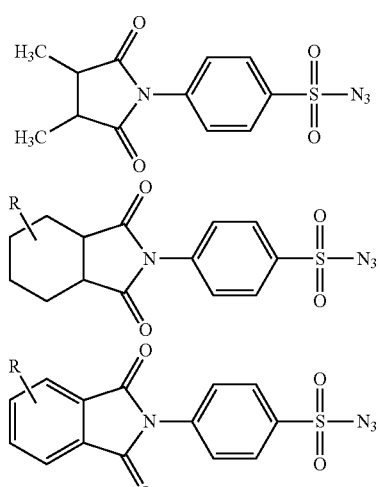

The functionalization can be performed in any suitable equipment capable of mixing polymers at a temperature in the range 80-250° C. Examples of such equipment are internal batch mixers (often called Banbury mixers), two-roll-mills (provided that the rolls can be heated), extruders, and the like.

The functionalized mono-azide is preferably mixed with the polymer in an amount of 0.01-20 phr, more preferably 0.05-10 phr, and most preferably 0.1-5 phr. The term "phr" means: weight parts per hundred weight parts of polymer.

In addition to the polymer and the mono-azide, radical scavengers and antioxidants may be added to the mixture. Examples of radical scavengers are t-butyl hydroquinone (TBHQ), 2,2,6,6-tetramethylpiperidinooxy (TEMPO), and 4-hydroxy-2,2,6,6-tetramethylpiperidin-1-oxyl (OH-TEMPO). Examples of suitable antioxidants are sterically hindered polynuclear phenols (e.g. Vulkanox® SKF, Vulkanox® DS, Vulkanox BKF, Irganox 1010), aminic antioxidants (e.g. Flectol TMQ), diphenyl diamin based antioxidants (e.g. Santonox 6PPD), and phosphites (e.g. Weston TNPP)

The functionalization is performed at a temperature in the range 80-250° C., preferably 90-230° C., more preferably 100-200° C., and most preferably 110-180° C. The temperature of choice depends on the type of polymer and the type of azide.

Sulfonyl azides (azidosulfonates) typically start to decompose into reactive nitrene moieties around 130° C. with a peak around 180° C.; azidoformates start to decompose above 110° C. with a peak at 160° C. The formed nitrene moieties react with the polymer, resulting in grafting of the nitrene onto the polymer.

One additional mechanism in which azides can react with unsaturated polymers is via the so-called "click" mechanism, which can occur below the decomposition temperature of the azide. On fully saturated polymers this "click" mechanism will not occur.

The preferred reaction time is 1-120 minutes, more preferably 1-60 minutes, and most preferably 2-30 minutes.

After functionalization, the polymer contains polar groups that (i) improve the interaction with fillers, (ii) improve the resistance to swell in apolar solvents like oils and fuels, and/or (iii) are reactive towards amine (preferably primary amines), anhydride, alcohol, thiol, and aldehyde groups. The reactivity towards these groups allows crosslinking of the modified polymers by other methods than the conventional peroxide or sulfur-cure processes. It also allows the introduction of further functionalities.

Examples of fillers of which the interaction with the polymer could be improved as a result of the functionalization are carbon black, silica, silicates, mica, aluminium oxides, hydroxides like magnesium hydroxides and aluminium hydroxides, carbonates like calcium carbonate, clays, nanoclays, sulfates like bariumsulfate, and natural organic fillers with polar character like wood or lignin fibres, cellulose fibres, and hemp.

Examples of substances comprising only one amine, anhydride, alcohol, thiol, or aldehyde group include aminoacids, polyether monoamines (Jeffamines), furfurylamine, and aminofunctional silanes (3-aminopropyldiisopropylethoxysilane, 3-aminopropyldimethylethoxysilane, N-(2-aminoethyl)-3-aminopropyl trimethoxysilane, N-(2-aminoethyl)-3-aminopropyl triethoxysilane, N-(6-aminohexyl) aminomethyl triethoxysilane, N-(6-aminohexyl) aminopropyl trimethoxysilane, N-(2-aminoethyl)-11-aminoudecyl trimethoxysilane, (aminoethylaminomethyl) phenylethyl trimethoxysilane, N-(2-aminoethyl)-3-aminopropyl methyl dimethoxy silane, N-(2-aminoethyl)-3-aminoisobutyl methyldimethoxysilane, (aminoethyl amino)-3-isobutyldimethylmethoxysilane, and (3-trimethoxysilylpropyl)diethylene triamine).

Examples of substances comprising two or more functionalities selected from amine, anhydride, alcohol, thiol, and aldehyde groups are aminoalcohols (e.g. ethanolamine, propanolamine, butanolamine, etc.), bis(hexamethylene)triamine, tris(2-aminoethyl)amine, 1,6-hexanediamine, isophorone diamine, 4-aminophenylether, bis(hexamethylene) triamine, 4-aminophenylether, 1,2-diamino butane, 1,4-diamino butane, 1,5-diamino pentane, 1,5-diamino(2 methyl)pentane, 1,7-diamino heptane, 1,8-diamino octane, 1,9-diamino nonane, 1,10-diamino decane, 1,12-diamino dodecane, 1,6-diamino-(2,2,3-trimethyl)hexane, tricyclododecane diamine, m-xylylene diamine, (ortho-, meta- and para) diamino benzene(phenylene diamine), 2,2'-dithiobis (ethylamine), dianiline methane, dianiline ether, dianiline sulphone, 2,2',6,6'-tetraethyl dianiline methane, 2,2',6,6'-tetramethyldianiline methane, 2,2'-dimethyl-6,6'-diethyl-dianiline methane, 2,2',6,6'-tetra-isopropyl dianiline methane, 2,2'-diisopropyl-6,6'-dimethyl dianiline methane, 1,8-diamino-menthane, 4-aminomethyl-1,8-octane diamine, N-phenyl-1,4-phenylene diamine, 4,4' dianilino diphenylamine, 1,8-diamino-3,6-dioxaoctane, 1,5-diamino-3-oxapentane, α,ω-poly tetrahydrofuryl diamines, α,ω-polyglycol diamines (Jeffamine®), α,ω-polypropoxy diamines (Jeffamines®), α,ω-polyethoxy-propoxy diamines, 3,5-diamino benzoic acid, 3,4-diamino benzophenone, 1,2-diamino cyclohexane, diamino naphthalene and diamino toluene, maleinized polybutadienes (Ricon MA series ex Sartomer), and polyethylene glycol (e.g. PEG-200).

The substance comprising one or more functionalities selected from amine, anhydride, alcohol, thiol, and aldehyde groups is preferably added to the functionalized polymer in a molar equivalent ratio of 0.5-10, more preferably 0.9-8, and most preferably 1-5. The term "molar equivalent ratio" refers to the total number of amine, anhydride, alcohol, thiol, and aldehyde groups that are able to react with the functional groups on the polymer relative to the total number of functional groups on the polymer.

The substance can be mixed with the functionalized polymer using standard equipment, like temperature-controlled two-roll-mills, extruders, internal mixers and the like. Preferably, a two roll mill is utilized, as it allows mixing at temperatures below the crosslink temperature of the mixture.

Mixing is preferably performed at a temperature in the range 20-120° C., more preferably 30-100° C. and most preferably 40-80° C.

A base catalyst may be added, particularly if the substance does not contain basic, e.g. amine, functionalities. Amines function as basic catalysts for the ring opening reaction to form the amide crosslinks.

Suitable base catalysts that may be added include tertiary amines, such as 1,4 diazabicyclo[2.2.2]octane (DABCO), triethylamine, and quinuclidinol, triphenylphosphine.

The catalyst can be added in amounts of 0.01 to 1 phr (weight parts per hundred weight parts of rubber), preferably 0.05 to 0.1 phr.

The resulting mixture can be shaped in a desired form. This shaping can be performed in a mould (compression, injection or transfer moulding), an extruder (where shaping dies can be installed at the extruder head), or a calender (to process a polymer melt into a sheet or thin film). Also a so-called thermoforming process can be used to form shapes from foils or sheets.

In order to allow crosslinking to occur, the shaped mixture is subsequently thermally treated at a temperature in the range 100-200° C., preferably 120-180° C., and most preferably 140-170° C.

Crosslinked polymers obtainable by the process of the present invention can be used in many applications as alternative for polymers crosslinked with sulfur cure accelerators or peroxides, including building and construction material (window and door profiles), wire- and cable applications, tyres (side walls, treads), (conveyer) belts, bladders, hoses, tubes, seals, gloves, dock fenders, footware, flooring, and escalator handrails.

Crosslinked material resulting from the process of the present invention can be de-crosslinked by thermal treatment and thereby re-cycled and re-used.

A particular advantage of the present invention is therefore that any scrap material resulting from the production of crosslinked articles using the present process—i.e. material that is not used in the final article but required, for example, to assure proper mould filling—can be re-used, because the scrap material can be easily de-crosslinked by thermal treatment and re-applied into the base polymer again. This allows for a better economical use and less waste.

De-crosslinking can be performed by thermally treating the crosslinked material at a temperature higher than the temperature used for crosslinking, in order to allow the reverse reaction to occur. Generally, this temperature will be in the range 180-300° C.

De-crosslinking can be accelerated by the presence of aliphatic primary monofunctional amines. An example of such an amine is cyclohexyl amine. In addition, in order to further enhance de-crosslinking, the crosslinked material may first be swollen using an appropriate solvent, before it's subjected to thermal treatment.

The thermal treatment can be performed in an oven, a heated mixer, or a heated mould. In a preferred embodiment, the material is first granulated before said heat treatment.

The de-crosslinked material can be added to a base polymer, which can subsequently be crosslinked again, either by using a substance in accordance with the present invention, or by the action of peroxides or sulphur cure accelerators.

EXAMPLES

Example 1—Preparation of 4-(2,5-dioxopyrrolidin-1-yl)benzenesulfonyl azide (succinimidobenzene sulfonylazide)

40.0 g 4-acetamidobenzenesulfonyl azide (ex Sigma Aldrich) was dissolved in 160 ml concentrated hydrochloric acid. The solution was stirred and heated to 80° C. for a maximum of 30 min. The clear solution was cooled to room temperature. At 70° C., a precipitate formed. The cooled mixture was added to ice-water (200 g) in order to dissolve all components and the resulting solution was added to 1000 gram of a 20% aqueous sodium carbonate solution. The product was extracted twice with 150 ml dichloromethane and the combined extracts were dried over sodium sulfate, filtered and concentrated in vacuum, and finally dried in air to remove all volatiles. This resulted in 30 gram of solid 4-aminobenzenesulfonyl azide:

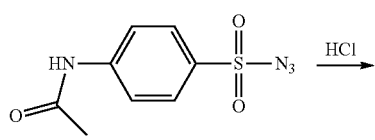

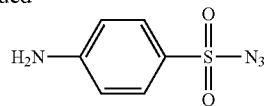

To a solution of 16.5 gram of 4-aminobenzenesulfonyl azide in 120 ml dichloromethane, 16.6 g succinic anhydride was added and the mixture was stirred for 3 hours at reflux temperature. The solids formed were isolated by filtration, rinsed with diethylether (60 ml) and dried at room temperature. This resulted in 24.7 g (99%) of 4-((4-(azidosulfonyl)phenyl)amino)-4-oxobutanoic acid as a white solid:

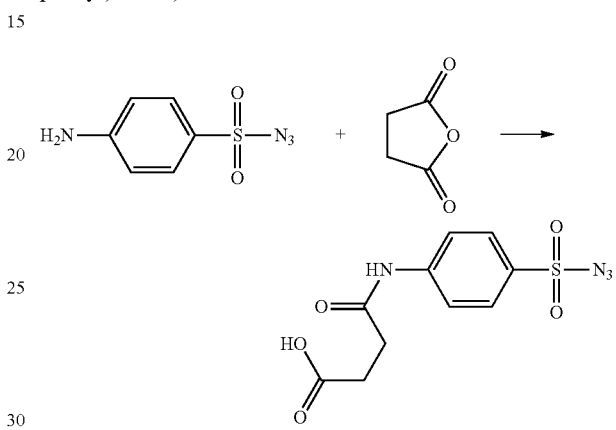

To 24.5 gram of 4-((4-(azidosulfonyl)phenyl)amino)-4-oxobutanoic acid were added 160 g acetic anhydride and 0.8 g sodiumacetate. The resulting suspension was stirred and heated to 85° C. for 90 minutes. The clear solution was cooled to room temperature, added to 1000 g ice and stirred until solids were formed. The formed solids were isolated by filtration, twice washed with water and dried at room temperature. The resulting white/yellowish solid was 16.8 g (73% yield) 4-(2,5-dioxopyrrolidin-1-yl)benzenesulfonyl azide:

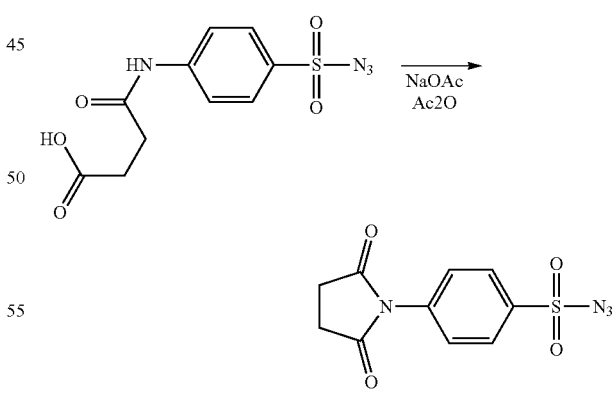

Example 2—Modification of a Polymer 50 grams of styrene-butadiene rubber (Buna VSL 4720-0 HM, styrene content 19.5%; vinyl content 47.5%, s-SBR), 1 gram of the succinimidobenzene sulfonylazide of Example 1, and 0.1 grams of tertbutyl-hydroquinone (TBHQ) were blended on a two-roll mill and intimately mixed. This blend was treated in an internal Banbury type mixer at 130-160° C. to allow grafting of the azide onto the s-SBR. During this grafting step the temperature of the mixture was allowed to rise to 160° C. within 20 minutes.

In an internal Banbury type mixer, the resulting compound was mixed with the components listed in Table 1. The silica (Ultrasil 7000 GR) was added to the rubber in two separate portions at 120° C. while allowing the temperature to rise to 150° C. for a maximum of 10 minutes.

The experiment was repeated with non-functionalized polymer, both with and without the further addition of Si69; a bifunctional, sulfur-containing organosilane ex-Evonik.

TABLE 1

|  | Invention | Comparative 1 | Comparative 2 |
|---|---|---|---|
| Functionalized polymer (g) | 23.5 | — | — |
| Non-functionalized polymer (g) | — | 23.5 | 22.6 |
| Ultrasil 7000 GR (g) | 18.4 | 18.8 | 18.0 |
| treated distillated aromatic extract oil (Vivatec 500) | 6.9 | 7.0 | 6.8 |
| Si69 (g) | — | — | 2.0 |

After addition of the silica and other additives to the SBR, a curative package based on sulfur and sulfur accelerators was added to a portion of the silica-filled rubber on a two-rol-mill. The cure pack is displayed in Table 2.

TABLE 2

|  | Invention | Comparative 1 | Comparative 2 |
|---|---|---|---|
| Silica-filled rubber (g) | 40 | 40 | 40 |
| Insoluble sulfur (Crystex HS OT10) (g) | 0.25 | 0.25 | 0.24 |
| N-tert-butyl-2-benzothiazyl sulfenamide (TBBS) (g) | 0.25 | 0.25 | 0.24 |
| Tetrabenzyl Thiuramdisulfide (TBzTD) (g) | 0.06 | 0.06 | 0.05 |
| ZnO (g) | 0.57 | 0.57 | 0.55 |
| Stearic acid (g) | 0.19 | 0.19 | 0.18 |

The resulting formulations were compared using the so-called Payne-effect-test, as described in *The science and technology of rubber*, 3$^{rd}$ edition, J. E. Mark, 2005, page 388. This test measures the Payne-effect of a filled system using a dynamic viscoelastic measurement. According to this experiment, a filled SBR rubber sample is subjected to periodic shear strain at 100° C. and 0.7 Hz. The strain is varied from 0.3% to 100%. The measurement is performed on a rubber analyzer, a "Visco Elastograph" ex Gottfert. This test measures the relationship between the sample's elasticity modulus and the subjected strain on the sample and thereby evaluates the interaction between the rubber and the filler by measuring the interaction between the filler particles. The filler-filler interaction is a good indication for the filler-rubber interaction: a high filler-filler interaction indicates a low filler-rubber interaction and vice versa.

Table 3 shows the results of the Payne test on uncured compounds. Comparative experiment 1 shows a high elasticity modulus (G') at low strain values and a fast breakdown to low G' values at high strain. This breakdown indicates the breakdown of the filler network and shows a strong filler-filler interaction and a poor filler-rubber interaction. The experiment according to the invention shows a low G' at low strain values and a gradual breakdown at high induced strain to G' values higher than those of comparative experiment 1. This proofs that modification with an azide according to the present invention leads to lower filler-filler interaction and higher filler-rubber interaction. This is particularly inferred from the higher modulus values at high strain, which indicate the presence of bound rubber. Bound rubber is a portion of the rubber that is irreversibly bound to the filler particles.

TABLE 3

| | elasticity modulus (G') in kPa | | |
|---|---|---|---|
| strain (%) | Invention1 | comp1 | comp2 |
| 0.3 | 619 | 1758 | 458 |
| 0.4 | 671 | 1923 | 485 |
| 0.6 | 712 | 2031 | 497 |
| 0.7 | 740 | 2097 | 509 |
| 1.4 | 778 | 2143 | 495 |
| 2.8 | 780 | 1788 | 465 |
| 4.2 | 760 | 1302 | 430 |
| 5.6 | 731 | 981 | 398 |
| 7.0 | 697 | 804 | 373 |
| 11.2 | 575 | 535 | 312 |
| 14.0 | 515 | 449 | 281 |
| 27.9 | 327 | 244 | 186 |
| 41.9 | 242 | 175 | 144 |
| 55.8 | 192 | 140 | 117 |
| 69.8 | 161 | 119 | 99 |
| 83.7 | 137 | 106 | 84 |
| 100.0 | 118 | 99 | 72 |

Because the filler-rubber interaction of the cured compounds are of utmost importance for the ultimate properties of the tire, this interaction has also been evaluated after cure of the compounds for 30 minutes at 160° C. (see Table 4). The same conclusions as for the uncured compounds can be drawn: the filler-rubber interaction is much stronger in the case of the azide-modified s-SBR according to the present invention.

TABLE 4

| | elasticity modulus (G') in kPa | |
|---|---|---|
| strain (%) | Invention1 | comp1 |
| 0.3 | 2222 | 2982 |
| 0.4 | 2183 | 3010 |
| 0.6 | 2163 | 3046 |
| 0.7 | 2142 | 3077 |
| 1.4 | 2075 | 3153 |
| 2.8 | 1990 | 2506 |
| 4.2 | 1928 | 2175 |
| 5.6 | 1883 | 1979 |
| 7.0 | 1840 | 1857 |
| 11.2 | 1706 | 1677 |
| 14.0 | 1560 | 1473 |

The better filler-rubber interaction results in a better dispersion of the filler and improved mechanical properties. This can be observed in Table 5 where the mechanical properties are compared. These mechanical data have been recorded after full crosslinking of the silica-filled SBR compounds in a heated mould at 160° C. for 30 minutes with a dimension 10×10 cm and a thickness of 2 mm, producing sheets with thickness of 2 mm. The mechanical properties were evaluated according to the following ISO standard: ISO 37:1995 Tensile stress-strain properties (tensile strength and elongation at break)

TABLE 5

| | σ max N/mm2 | εR % | σ 100 N/mm2 | σ 200 N/mm2 | (σ200/ σ100)*2 | σ 300 N/mm2 | σ 500 N/mm2 | IRHD |
|---|---|---|---|---|---|---|---|---|
| Inv. | 13.9 | 450 | 2.3 | 4.7 | 4.09 | 8.2 | 14.2 | 79.0 |
| Comp1 | 10.0 | 496 | 2.6 | 4.01 | 3.08 | 5.78 | 9.87 | 99.0 |
| Comp2 | 13.3 | 251 | 4.5 | 10.1 | 4.49 | — | — | 79.0 |

Table 5 clearly shows the effects of the polymer modification: increased tensile strength (σ max) while maintaining proper elongation at break (εR). The modulus values σ100 and σ200 indicate tensile properties at 100 and 200% elongation and allow calculation of the reinforcement parameter (σ200/σ100)*2. This reinforcement results from enhanced interaction between the elastomer and the filler, which is clearly stronger in the experiment according to the invention than in comparative experiment 1.

The better dispersion of the filler can also be observed by the hardness of the compound as indicated by the IRHD value. This hardening of the rubber after cure is measured by the IRHD hardness (International Rubber Hardness Degrees, ISO 48). Table 5 shows that with the same silica content (80 phr), the composition made by the process according to the invention has lower hardness after cure than the composition of comparative experiment 1. Comparative experiment 2, making use of a silane coupling agent, also shows the lower hardness but at the expense of a lower elongation at break. The higher hardness in comparative experiment 1 is probably due to so-called flocculation: agglomeration of the dispersed silica particles. This agglomeration leads to tough structures, adding to the increased hardness of the compound. Flocculation further makes processing of the silica compound more difficult, lowers the shelf life of the silica-filled compound, and leads to undesirable and unpredictable mechanical properties of the end product.

The compound prepared in accordance with the present invention has no or only a marginal flocculation, which is probably due to the improved dispersion of the silica in the rubber, and due to the increased interaction between the rubber and the silica, resulting in a decreased filler-filler interaction.

Example 3—Filler Rubber Interaction

The functionalized rubber of Example 2 and the non-functionalized rubber were mixed with the components listed in Table 6 in an internal Banbury type mixer. Silica (Ultrasil 7000 GR) was added in two separate portions to the rubber at 120° C. while allowing the temperature to rise to 150° C. for a maximum of 10 minutes.

TABLE 6

| | Invention | Comparative |
|---|---|---|
| Functionalized polymer (g) | 23 | — |
| Non-functionalized polymer (g) | — | 23 |
| Ultrasil 7000 GR (g) | 18 | 18.4 |
| treated distillated aromatic extract oil (Vivatec 500) (g) | 6.8 | 6.9 |
| 3-aminopropyl-triethoxysilane (APTS) (g) | 0.9 | 0.9 |

The resulting compounds were cured as described in Example 2 and the filler-filler interaction was evaluated by observing the Payne effect after cure of the compounds for 30 minutes at 160° C. (see Table 7). The Payne effect and therefore the filler-filler interaction is more pronounced in the comparative composition, as seen from the increasing elastic modulus values at low strain. The composition according to the invention shows a much lower Payne effect indicating an improved filler-rubber and lower filler-filler interaction (i.e lower flocculation).

TABLE 7

| | elasticity modulus (G') in kPa | |
|---|---|---|
| strain (%) | Invention | Comparative |
| 0.3 | 1247 | 2406 |
| 0.4 | 1270 | 2450 |
| 0.6 | 1284 | 2486 |
| 0.7 | 1289 | 2508 |
| 1.4 | 1299 | 2539 |
| 2.8 | 1279 | 2366 |
| 4.2 | 1256 | 2057 |
| 5.6 | 1235 | 1857 |
| 7.0 | 1178 | 1721 |
| 11.2 | 1116 | 1432 |
| 14.0 | n.d. | 1246 |

Example 4—Filler-Rubber Interaction

Example 2 was repeated, except that magnesium hydroxide was used instead of silica. Magnesium hydroxide is a very polar filler with a poor compatibility with elastomers. Table 8 shows the compound recipes. Magnesium hydroxide was mixed into the modified sSBR using in an internal Banbury type mixer operated at 130° C. for a maximum of 15 minutes while allowing the temperature to rise to 150° C.

TABLE 8

| | Invention | Comparative |
|---|---|---|
| total recipe (phr) | | |
| BUNA VSL 4720-0-HM | 100 | 100 |
| Succinimidobenzene sulfonylazide | 2 | |
| Tert-butyl hydroquinone (TBHQ) | 0.2 | |
| Magnesium dihydroxide (Magshield UF NB-10) | 200 | 200 |

The resulting compound was tested for filler dispersion using the Payne test as described above. Table 9 shows the high elasticity modulus (G') as function of the imposed strain. This breakdown indicates the breakdown of the filler network and is clearly more significant in the comparative sample than in the sample of the invention. This indicates that magnesium hydroxide is more properly dispersed in the sample of the invention.

TABLE 9

| strain (%) | elasticity modulus (G') in kPa | |
| --- | --- | --- |
| | Invention | Comparative |
| 0.3 | 831 | 1410 |
| 0.4 | 879 | 1501 |
| 0.6 | 874 | 1478 |
| 0.7 | 867 | 1423 |
| 1.4 | 824 | 1084 |
| 2.8 | 761 | 792 |
| 4.2 | 717 | 656 |
| 5.6 | 683 | 569 |
| 7.0 | 655 | 513 |
| 11.2 | 584 | 405 |
| 14.0 | 540 | 357 |
| 27.9 | 386 | 235 |
| 41.9 | 292 | 176 |
| 55.8 | 230 | 140 |
| 69.8 | 188 | 117 |
| 83.7 | 156 | 100 |
| 100.0 | 129 | 82 |

Example 5—Crosslinking 50 grams of EPDM were mixed with 1 g (2 phr) succinimido-benzene sulfonylazide and added to an internal mixer, preheated to 180° C., with a rotor speed of 50 rpm, for 12-15 minutes.

An amine (either bis(hexamethylene)triamine or 1,6-hexanediamine) was added to the functionalized EPDM using a temperature controlled two-roll mill, operating at a temperature between 20 and 40° C. Table 10 indicates the amount of amine functionalities in molar equivalents, i.e. the total number of primary amine groups originating from the amine relative to the total number of succinimide groups on the polymer.

Rheometer (Alpha Technologies MDR2000) data, recorded at 150° C. for 30 minutes, were obtained according to ISO 6502-1991 (Measurement of vulcanization characteristics with rotorless curemeters). The parameters indicated in the table are: t90 (time to 90% of maximal torque) and delta S. Delta S is an indicator for the ultimate crosslink density achieved.

TABLE 10

| | | 1 | 2 | 3 | 4 | 5 | 6 | 7 | 8 | 9 |
| --- | --- | --- | --- | --- | --- | --- | --- | --- | --- | --- |
| EPDM | | 100 | 100 | 100 | 100 | 100 | 100 | 100 | 100 | 100 |
| Succinimido-benzene sulfonylazide | phr | 2 | 2 | 2 | 2 | 2 | 2 | 2 | 2 | 2 |
| bis(hexamethylene) triamine | Eq. | 0 | 0.5 | 1 | 2 | 4 | | | | |
| 1,6-hexanediamine | Eq. | 0 | | | | | 0.5 | 1 | 2 | 4 |
| Rheometer data: | | | | | | | | | | |
| t90 | min | 22.8 | 15.2 | 14.6 | 13.3 | 7.1 | 17.3 | 16.8 | 19.1 | 10.7 |
| delta S | Nm | 0.05 | 0.09 | 0.14 | 0.27 | 0.21 | 0.05 | 0.08 | 0.17 | 0.24 |

Table 10 shows that, for optimal crosslinking (highest delta S), more than 1 molar equivalent of amine-functional substance is desired. It also shows that there is an optimum in the amount of said substance. The latter is probably due to its action as chain stopper, if overdosed.

Table 10 further shows that the cure speed (t90) increases with the amine content. This is probably due to the fact that the crosslinking is base catalysed.

Example 6—De-crosslinking

The excess of the amine-functional substance, and the reversible character of the formed imide link, can be used to induce de-crosslinking to allow recycling of the crosslinked polymer. The following table shows that polymers crosslinked by the process of the present invention can be de-crosslinked by subjecting them to higher temperatures.

TABLE 11

| | | Crosslinked polymer of Example 5, experiment: | | |
| --- | --- | --- | --- | --- |
| | | 3 | 4 | 9 |
| bis(hexametylene) triamine | Eq | 1 | 2 | |
| 1,6 hexanediamine | Eq | | | 4 |
| crosslinking T | [° C.] | 150 | 150 | 150 |
| crosslinking time | [min] | 30 | 30 | 30 |
| de-crosslinking T | [° C.] | 200 | 200 | 200 |
| de-crosslinking time | [min] | 60 | 60 | 60 |
| de-crosslinking % | [%] | 19 | 54 | 80 |

The de-crosslinking was determined by rheometry on a Gottfert Visco Elastograph applying the following method: the torque difference after crosslinking at 150° C. for 30 minutes (see Table 11) was taken as a measure for the crosslink density. The same sample was then heated to 200° C. for 60 minutes to allow de-crosslinking, and the crosslinking was again measured at 150° C. to determine the residual torque in the rheometer. The relative drop in torque compared to the original torque is the amount of de-crosslinking.

These experiments show that, after heating at 200° C., up to 80% of the crosslinks disappeared.

There is no re-crosslinking when continuously heating at 150° C. after de-crosslinking, which indicates that the de-crosslinking seems to be the result of the reaction of excess amine with succinimide functionalities, thereby cleaving the reversible crosslinks, and forming end-functionalities (as a kind of chain stoppers which prevent re-crosslinking).

The invention claimed is:

1. Process for functionalizing a polymer selected from the group consisting of elastomers, polyolefins and combinations thereof, by treating said polymer at a temperature in the range 80-250° C. with a mono-azide of the formula

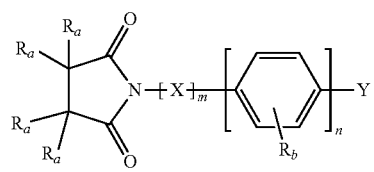

wherein Y is

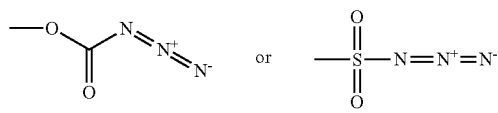

m is 0 or 1, n is 0 or 1, n+m=1 or 2, X is a linear or branched, aliphatic or aromatic hydrocarbon moiety with 1-12 carbon atoms, optionally containing heteroatoms, $R_b$ is selected from the group consisting of hydrogen, linear and branched alkyl groups with 1-6 carbon atoms optionally substituted with O, S, P, Si, or N-containing functional groups, alkoxy groups with 1-6 carbon atoms, and halogens, and each $R_a$ is individually selected from hydrogen and linear or branched alkyl groups with 1-6 carbon atoms, or may form a saturated or unsaturated aliphatic or aromatic ring structure with at least one other $R_a$.

2. Process according to claim 1, wherein the treated polymer is further reacted with a substance comprising one or more functionalities selected from amine, anhydride, alcohol, thiol, and aldehyde functionalities.

3. Process according to claim 2 wherein the substance has one or more amine functionalities.

4. Process according to claim 2 wherein the substance is selected from aminoacids, furfurylamine, polyether monoamines, and aminofunctional silanes.

5. Process according to claim 2 wherein the substance is selected from the group consisting of bis(hexamethylene) triamine, tris(2-aminoethyl)amine, 1,6-hexanediamine, isophorone diamine, 4-aminophenylether, maleinized polybutadienes, and polyethylene glycol.

6. Process for crosslinking a polymer comprising the steps of:
  a. functionalizing said polymer according the process of claim 1 to form a functionalized polymer and
  b. reacting the functionalized polymer with a substance comprising two or more functionalities selected from amine, anhydride, alcohol, thiol, and aldehyde functionalities.

7. Process according to claim 1 wherein $R_b$ is hydrogen.

8. Process according to claim 1 wherein n+m=1.

9. Process according to claim 1 wherein each $R_a$ is hydrogen.

10. Process according to claim 9 wherein the mono-azide is succinimidobenzene sulfonylazide.

11. Process according to claim 1 wherein the elastomer is selected from the group consisting of natural rubber (NR), styrene butadiene rubber (SBR), butadiene rubber (BR), butyl rubber (IIR), ethylene propylene copolymer elastomer (EPM), ethylene propylene diene terpolymer elastomer (EPDM), and ethylene vinylacetate copolymer (EVA).

12. Process according to claim 1 wherein the polyolefin is selected from the group consisting of polyethylene, polypropylene, and polyolefin elastomers.

13. Process for de-crosslinking a polymer obtainable by the process of claim 6, wherein the crosslinked polymer is heated to a temperature higher than the temperature that was used for its crosslinking.

14. Process according to claim 13 wherein the crosslinked polymer is heated to a temperature in the range 180-250° C.

15. Process according to claim 13 wherein an aliphatic primary monofunctional amine is present during said heating.

* * * * *